(12) United States Patent
Sokol et al.

(10) Patent No.: US 10,780,493 B1
(45) Date of Patent: Sep. 22, 2020

(54) THREE-DIMENSIONAL PRINTING OF ENGINEERED, ON-DEMAND, CERAMIC FILTERS FOR CASTINGS

(71) Applicant: Renaissance Services, Inc., Fairborn, OH (US)

(72) Inventors: Dan Z. Sokol, Dayton, OH (US); Ricky Lynn Pressley, Indiantown, FL (US); Bryan Deptowicz, Beavercreek, OH (US); Scott Morris, Columbus, OH (US)

(73) Assignee: Renaissance Services, Inc., Fairborn, OH (US)

( * ) Notice: Subject to any disclaimer, the term of this patent is extended or adjusted under 35 U.S.C. 154(b) by 240 days.

(21) Appl. No.: 15/840,966

(22) Filed: Dec. 13, 2017

Related U.S. Application Data

(60) Provisional application No. 62/436,782, filed on Dec. 20, 2016.

(51) Int. Cl.
| | | |
|---|---|---|
| *B22D 41/00* | (2006.01) | |
| *B22D 43/00* | (2006.01) | |
| *B28B 1/00* | (2006.01) | |
| *B01D 39/20* | (2006.01) | |
| *B28B 17/00* | (2006.01) | |

(52) U.S. Cl.
CPC ....... *B22D 43/004* (2013.01); *B01D 39/2082* (2013.01); *B28B 1/001* (2013.01); *B28B 17/0081* (2013.01); *B01D 2239/065* (2013.01)

(58) Field of Classification Search
CPC ...... B33Y 10/00; B33Y 30/00; B01D 39/2075
See application file for complete search history.

(56) References Cited

U.S. PATENT DOCUMENTS

| | | | | |
|---|---|---|---|---|
| 8,475,946 B1* | 7/2013 | Dion | .............. | B28B 1/001 |
| | | | | 428/702 |
| 8,568,649 B1* | 10/2013 | Balistreri | ............... | B32B 18/00 |
| | | | | 264/642 |
| 2016/0038866 A1* | 2/2016 | Gibson | ............. | B01D 39/2093 |
| | | | | 210/435 |

FOREIGN PATENT DOCUMENTS

CA          2992848 A1 *   1/2017   ......... B01D 39/2093

\* cited by examiner

*Primary Examiner* — Scott R Kastler
(74) *Attorney, Agent, or Firm* — Wood Herron & Evans LLP

(57) ABSTRACT

Systems and methods are disclosed that overcome problems with conventional filters for high temperature casting materials. According to embodiments, uniform, engineered filters enable consistent and repeatable metal flow rates without becoming a secondary source of contamination. Proven Additive Manufacturing (AM) methods generate engineered filters that achieve consistent filtration efficiency and predictable metal flow into a casting mold. Through this application of AM for ceramics, the resulting filter incorporates features that can be adjusted on-demand to address the needs of specific alloys and geometries applied in the production of castings. According to an embodiment, the method includes generating, using an additive manufacturing apparatus, a plurality of layers, wherein each layer includes individual ceramic ligaments arranged in a grid pattern having a two-dimensional rotational orientation. The method further includes stacking the layers along a thickness direction to form the filter.

16 Claims, 4 Drawing Sheets

THREE-DIMENSIONAL PRINTING OF ENGINEERED, ON-DEMAND, CERAMIC FILTERS FOR CASTINGS

RELATED APPLICATION

This application is the Non-Provisional Application claiming priority to U.S. Provisional Patent Application No. 62/436,782 filed Dec. 20, 2016, the disclosure of which is incorporated herein by reference.

FIELD OF THE INVENTION

This disclosure relates to filters that remove impurities from, and provide precise, predictable material flow for high temperature castings.

BACKGROUND OF THE INVENTION

To produce castings, molten metal is allowed to flow through porous ceramic filters to minimize dross and other forms of contamination. These filters are the last line of defense against inclusions that result from contaminants. Despite their intended purpose, however, ceramic filters can be a secondary source of contamination as minute pieces of the filter material can break loose and enter the molten metal stream. Current standard filters have small dendrite-like ceramic protrusions that can break-off during the casting metal pour. When one or more minute pieces of the filter ends up in the casting, flaws in the casting including secondary grain nucleation can occur.

In addition, conventional filters are essentially random ceramic sponges, which do not tightly control the metal flow rate, often restricting metal flow, or because of variations in their physical structure, cause wide disparities in metal flow rate into the casting. Cooling rate and heat flow are important parameters in castings, and variations can negatively impact the solidification process. There is thus a need for improved filter technology for high temperature casting materials to mitigate the aforementioned problems.

SUMMARY OF THE INVENTION

Systems and methods are disclosed that overcome problems with conventional filters for high temperature casting materials. According to embodiments, uniform, engineered filters enable consistent and repeatable metal flow rates without becoming a secondary source of contamination. Proven Additive Manufacturing (AM) methods generate engineered filters that achieve consistent filtration efficiency and predictable metal flow into the mold. Use of AM (i.e., three-dimensional (3D) printing) to print filters enables production of engineered filtration structures that can be tailored to meet specific requirements that can be produced literally "on-demand."

According to an embodiment, a ceramic filter that removes impurities from high temperature casting materials is disclosed. The filter includes a plurality of layers, each layer comprising individual ceramic ligaments arranged in a grid pattern having a two-dimensional rotational orientation.

According to a further embodiment, a method of manufacturing a ceramic filter includes generating, using an additive manufacturing apparatus, a plurality of layers, wherein each layer includes individual ceramic ligaments arranged in a grid pattern having a two-dimensional rotational orientation. The method further includes stacking the layers along a thickness direction to form the filter.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference characters may indicate identical or functionally similar elements.

Figure 1:
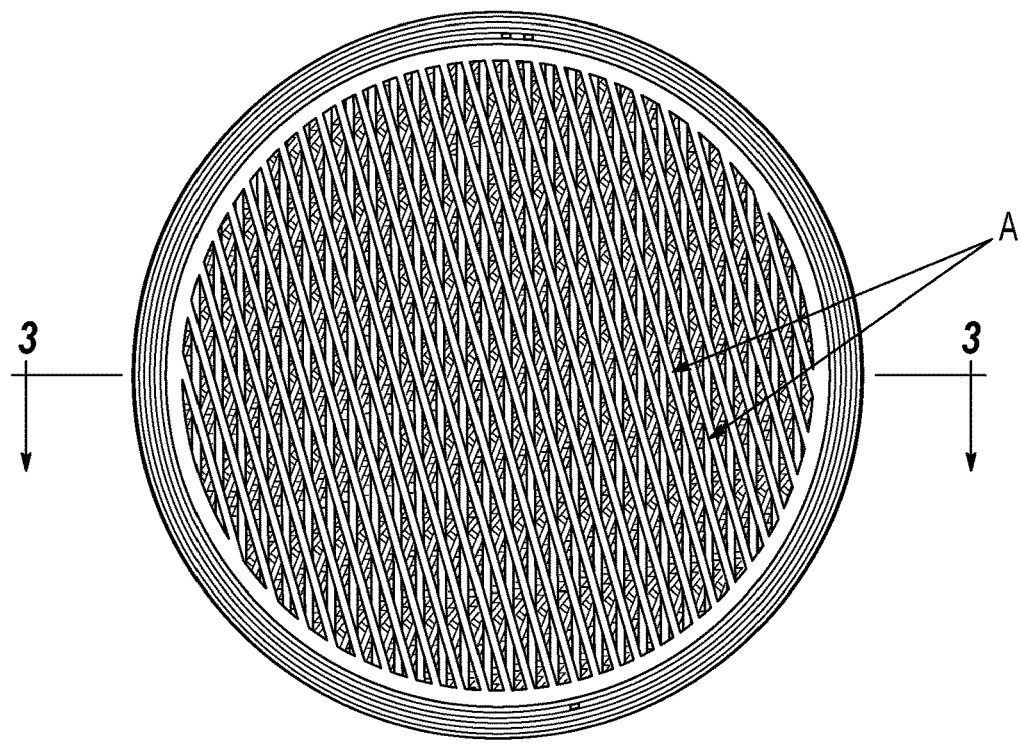
FIG. 1 is a schematic illustration of a ceramic filter having ligaments arranged with varying orientation, according to an embodiment.

The disclosed invention is described below with reference to the accompanying drawings.

DETAILED DESCRIPTION

The disclosed invention relates to the casting of high temperature metals or alloys to make articles such as airfoils and structural components for gas turbine engines, aircraft, and other products that use metal castings. Conventional production of these castings typically employs filters to capture impurities and to control the flow of molten material into the casting mold. Conventional filters suffer from a number of drawbacks, however, as noted above. According to embodiments, ceramic filters, when produced from ceramic materials using Additive Manufacturing (AM), exhibit improved performance and may be used in many applications in the field of metal castings.

References in this specification to "one embodiment," "an embodiment," an "example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one of ordinary skill in the relevant art to affect such feature, structure, or characteristic in connection with other embodiments whether or not explicitly described.

The following detailed description refers to the accompanying drawings that illustrate exemplary embodiments. Other embodiments are possible, and modifications may be made to the embodiments within the spirit and scope of this description. Those of ordinary skill in the relevant art with access to the teachings provided herein will recognize additional modifications, applications, and embodiments within the scope thereof and additional fields in which embodiments would be of significant utility. Therefore, the detailed description is not meant to be limited to the embodiments described below.

Embodiments of the invention may be implemented in hardware, firmware, software, or any combination thereof. Embodiments may also be implemented as instructions stored on a non-transitory machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

Disclosed embodiments apply AM of ceramic material to form a filter for high temperature metal materials used for casting. According to an embodiment, the AM method may use vat photopolymerization, using Digital Light Processing (DLP), with the light moving along the X-Y axes and the platform containing the parts generated moving along the Z axis.

Disclosed embodiments generate of a series of precisely produced and controlled ligaments to form the filter. These ligaments can be adjusted for individual filters through the AM process to both control flow of material through the filter and to efficiently capture impurities. This ability to engineer a filter for specific applications recognizes the need to address differences in alloys and the material flow rate required to achieve optimal thermal and mechanical properties within the casting process.

According to various embodiments, engineering and production processes for the engineered filters include systematic layering of individual ligaments, which are arranged in a grid pattern within the filter. The number of ligaments, their twist, thickness, and orientation can be varied through on-demand adjustments of a Computer Aided Design (CAD) model applied to produce the filter using AM. Compared to standard filters, which are random in their construction and asymmetrical in their geometry, the disclosed embodiments offer consistent, symmetrical filters that yield predictable results.

FIG. 1 is a schematic illustration of a ceramic filter having ligaments arranged with varying orientation, according to an embodiment. In this example, ligaments may be arranged to meet the needs of the casting. Ligaments (A) and their orientation are generated through a combination of the CAD model and control of the AM process, based on the model, to meet the geometries and dimensions specified in the CAD model. The filter may range in size from small (1" diameter), for in-line applications, to larger (3-4" diameter) for pour-cup application. The height of the filter may be varied, as may the number of ligaments to correspond to the height. In further embodiments, other sizes and geometries may be generated.

Figure 2:
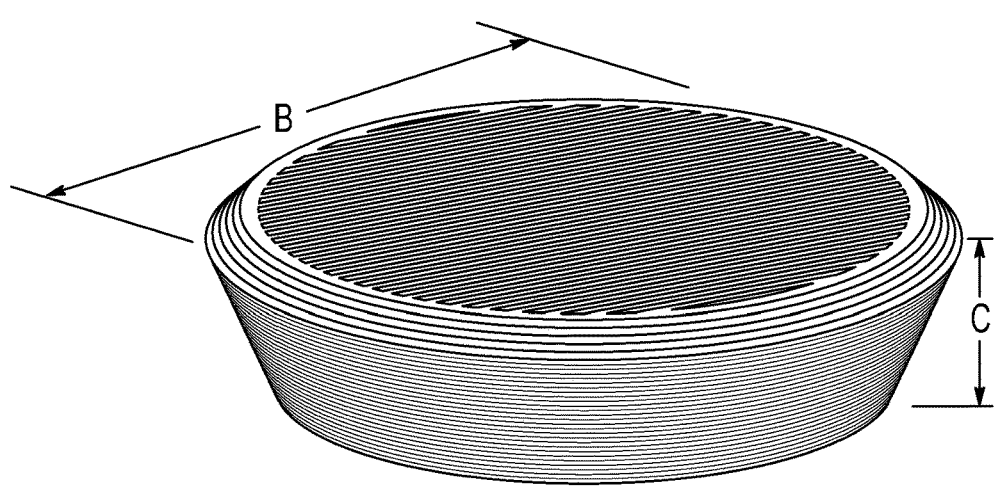
FIG. 2 is a schematic illustration of a perspective view of a ceramic filter, according to an embodiment.

FIG. 2 is a schematic illustration of a perspective view of a ceramic filter, according to an embodiment. This perspective view of the engineered filter (FIG. 2) illustrates a diameter (B) in relation to height (C). As shown, the diameter may vary with height from layer to layer so as to generate a wide variety of shapes as needed.

Figure 3:
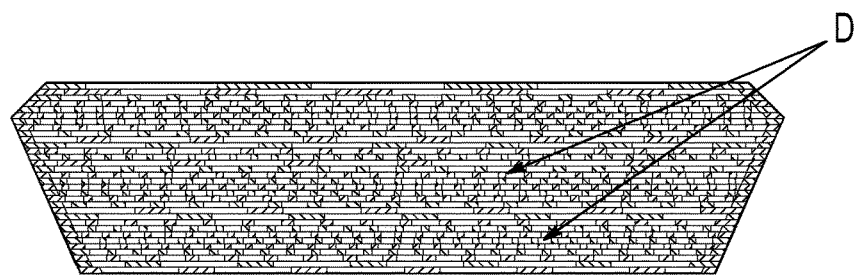
FIG. 3 is a schematic illustration of a cross section of a ceramic filter, according to an embodiment.

FIG. 3 is a schematic illustration of a cross section of a ceramic filter, according to an embodiment. This cross sectional view of an engineered filter (FIG. 3) reveals its precise and intricate aspects (D), which are produced through the AM process. Complex channels (D) may be formed by spaces between ligaments within layers having of varying orientation. Such channels control the flow of molten metal through the filter.

Figure 4:
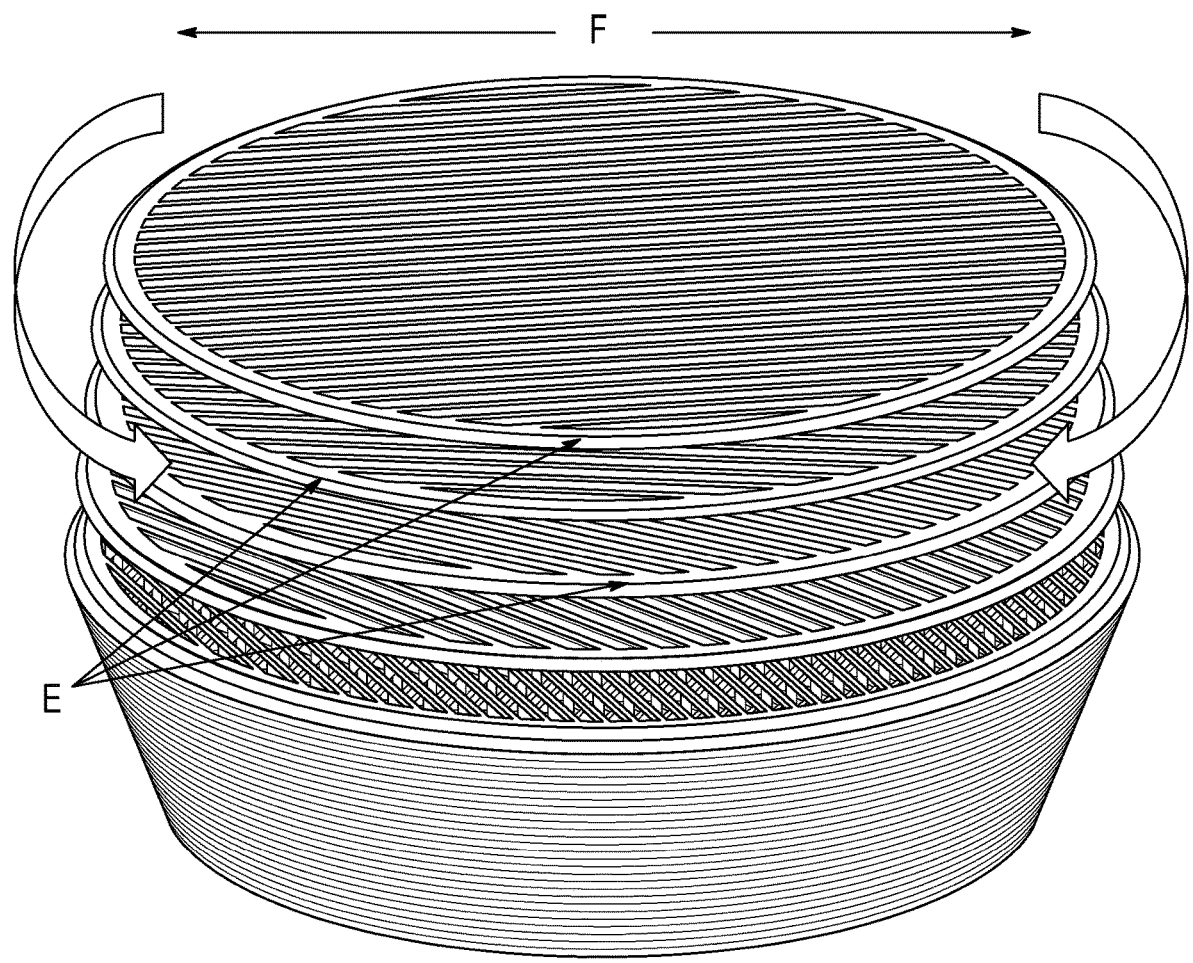
FIG. 4 is a schematic illustration of a three dimensional view of a ceramic filter having a plurality of layers of varying orientation, according to an embodiment.

FIG. 4 is a schematic illustration of a three dimensional view of a ceramic filter having a plurality of layers, according to an embodiment. Realization of the on-demand engineered filter is achieved through the ability to precisely adjust each layer of ligaments, as shown in FIG. 4. This adjustment includes orientation, geometry, dimension, and number of layers (E) as well the rotation (F) of the layers so that they can be individually clocked (i.e., adjustment of a two-dimensional rotational orientation) in order to modify the flow rate of metal through the filter as required by the casting. This clocking is performed within the CAD model and translated directly to the AM process, effectively providing on-demand engineered filters in lot sizes as small as one.

Figure 5:
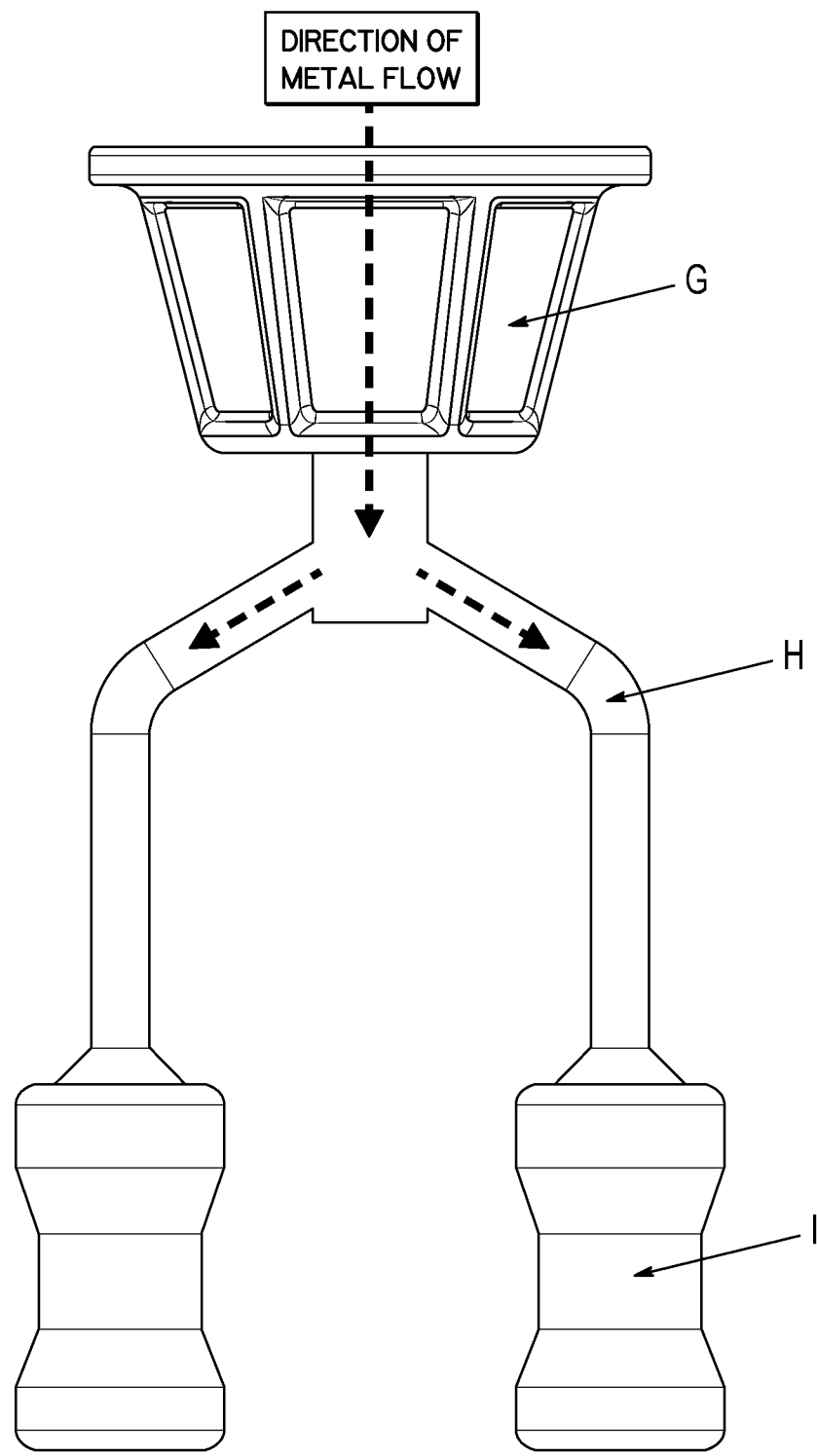
FIG. 5 is a schematic illustration of an apparatus for a molten metal casting in a pour-cup configuration, according to an embodiment.
Figure 6:
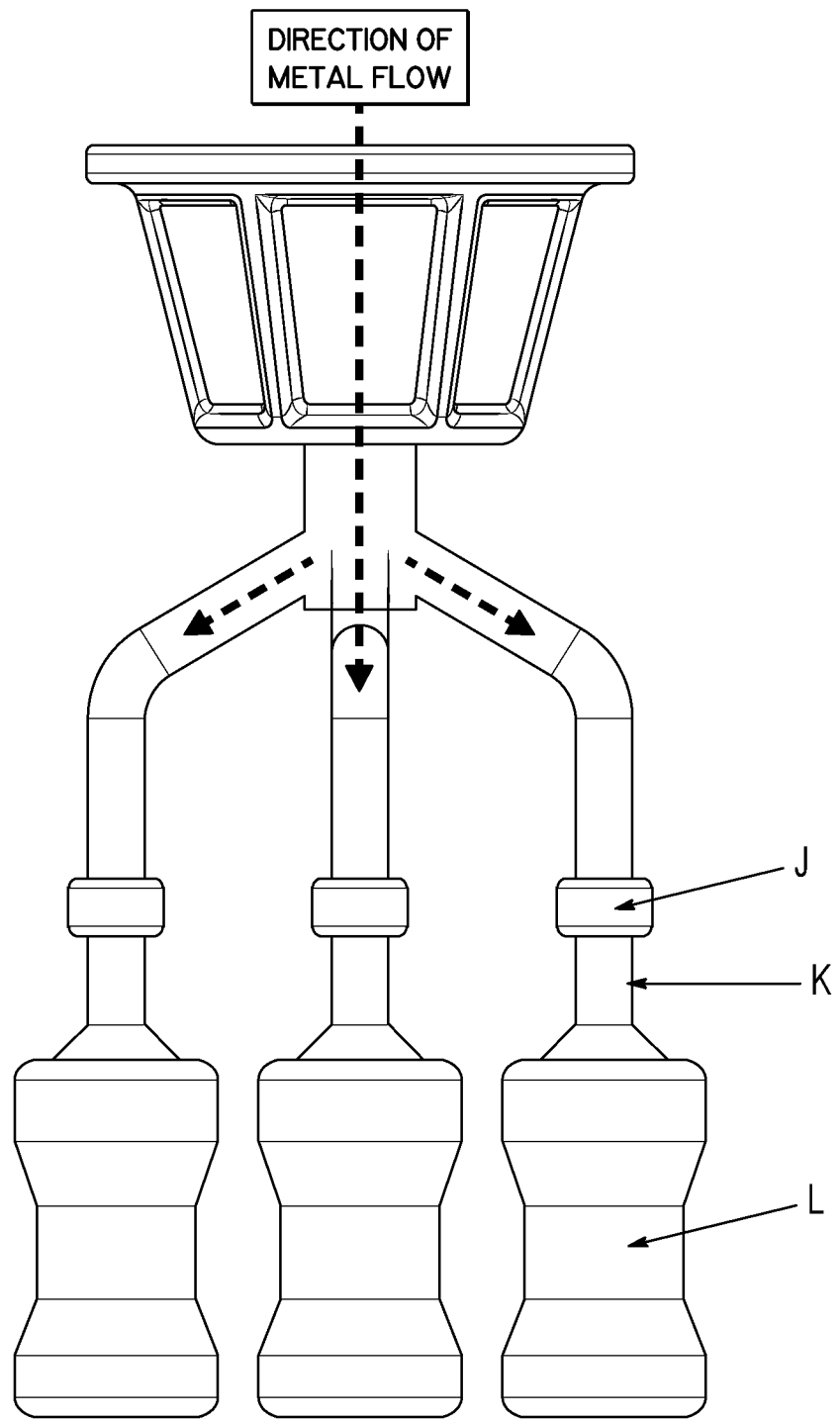
FIG. 6 is a schematic illustration of an apparatus for a molten metal casting in an in-line configuration, according to an embodiment.

FIG. 5 is a schematic illustration of an apparatus for a molten metal casting in a pour-cup configuration, according to an embodiment, and FIG. 6 is a schematic illustration of a an apparatus for a molten metal casting in an in-line configuration, according to a further embodiment. For pour-cup application, as shown in FIG. 5, the filter (G) is placed above sprues and runners (H) that convey the molten metal to a ceramic mold (I) that ultimately yields the finished casting. For in-line application, as shown in FIG. 6, the filter (J) is placed just above a gating (K) that is the entry point for the molten metal into a casting mold (L).

CONCLUSION

The Summary and Abstract sections may set forth one or more but not all example embodiments and thus are not intended to limit the scope of embodiments of the invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the invention that others can, by applying knowledge of those of ordinary skill in the art, readily modify and/or adapt for various applications such specific embodiments, without undue experimentation, without departing from the general concept of embodiments of the invention. Therefore, such adaptation and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the invention should not be limited by any of the above-described example embodiments, but should be defined only in accordance with the following claims and their equivalents.

What is claimed is:

1. A ceramic filter that removes impurities from high temperature casting materials, the filter comprising:
   a plurality of layers, each layer comprising a plurality of individual ceramic ligaments spanning across the layer;
   each ligament layer being formed by an additive manufacturing method in a stacked formation of ligament layers;
   the relative two-dimensional rotational orientation of at least two adjacent layers varying from layer to layer to form a three-dimensional a grid pattern in the filter for the passage of molten material therethrough.

2. The filter of claim 1, wherein each layer comprises a circular boundary having a predetermined diameter.

3. The filter of claim 2, wherein the diameter of the layers varies from layer to layer for some or all of the layers of the plurality of layers.

4. A method of manufacturing a ceramic filter that removes impurities from high temperature casting materials, the method comprising:
   generating, using an additive manufacturing process, a plurality of layers, each layer comprising individual ceramic ligaments spanning across the ligament layers;
   stacking the ligament layers along a thickness direction to form the filter;
   varying, from layer to layer, the relative two-dimensional rotational orientation of at least two adjacent layers to form a three-dimensional grid pattern in the filter for the passage of molten material therethrough.

5. The method of claim 4, further comprising:
   generating, using a processor, a digital model of the filter using a computer aided design environment and using the digital model of the filter in the additive manufacturing process; and
   causing the additive manufacturing apparatus to generate generating and stacking the plurality of layers based on the digital model.

6. The method of claim 4, further comprising:
   varying one or more of a number of the ligament layers or a thickness of the ligament layers to generate the filter based on a flow rate through the filter.

7. The method of claim 4, further comprising:
   generating the layers to each comprise a circular boundary having a predetermined diameter.

8. The method of claim 7, further comprising:
   generating and stacking the ligament layers to form a filter and varying the diameter of the ligament layers from layer to layer for some or all of the layers of the plurality of ligament layers.

9. The method of claim 4, further comprising:
   generating and stacking the layers and varying the relative two-dimensional rotational orientation of at least two adjacent layers to provide a desired flow rate of a casting material through the filter.

10. The filter of claim 2, wherein the stacked formation of ligament layers forms a filter having a height, the diameters of the layers varying along the height of the filter.

11. The filter of claim 1, wherein the ligaments are generally linear ligaments spanning across the layer.

12. The filter of claim 1, wherein at least two adjacent ligament layers vary in thickness from layer to layer.

13. The method of claim 4, further comprising stacking the ligament layers along a thickness direction to form a filter having a height, and varying the diameters of the ligament layers along the height of the filter.

14. The method of claim 4, further comprising generating ligament layers wherein the ligaments are generally linear ligaments spanning across the layer.

15. The method of claim 4, further comprising varying at least two adjacent layers in thickness from layer to layer.

16. The filter of claim 1, wherein a ligament layer in a stacked plurality of ligament layers has a rotational orientation that is varied from the rotational orientation of adjacent ligament layers.

* * * * *